Jan. 11, 1927.

O. H. RECHARD
EXTRUSION MACHINE
Filed Jan. 7, 1925

INVENTOR
Ottis H. Rechard
BY
ATTORNEYS

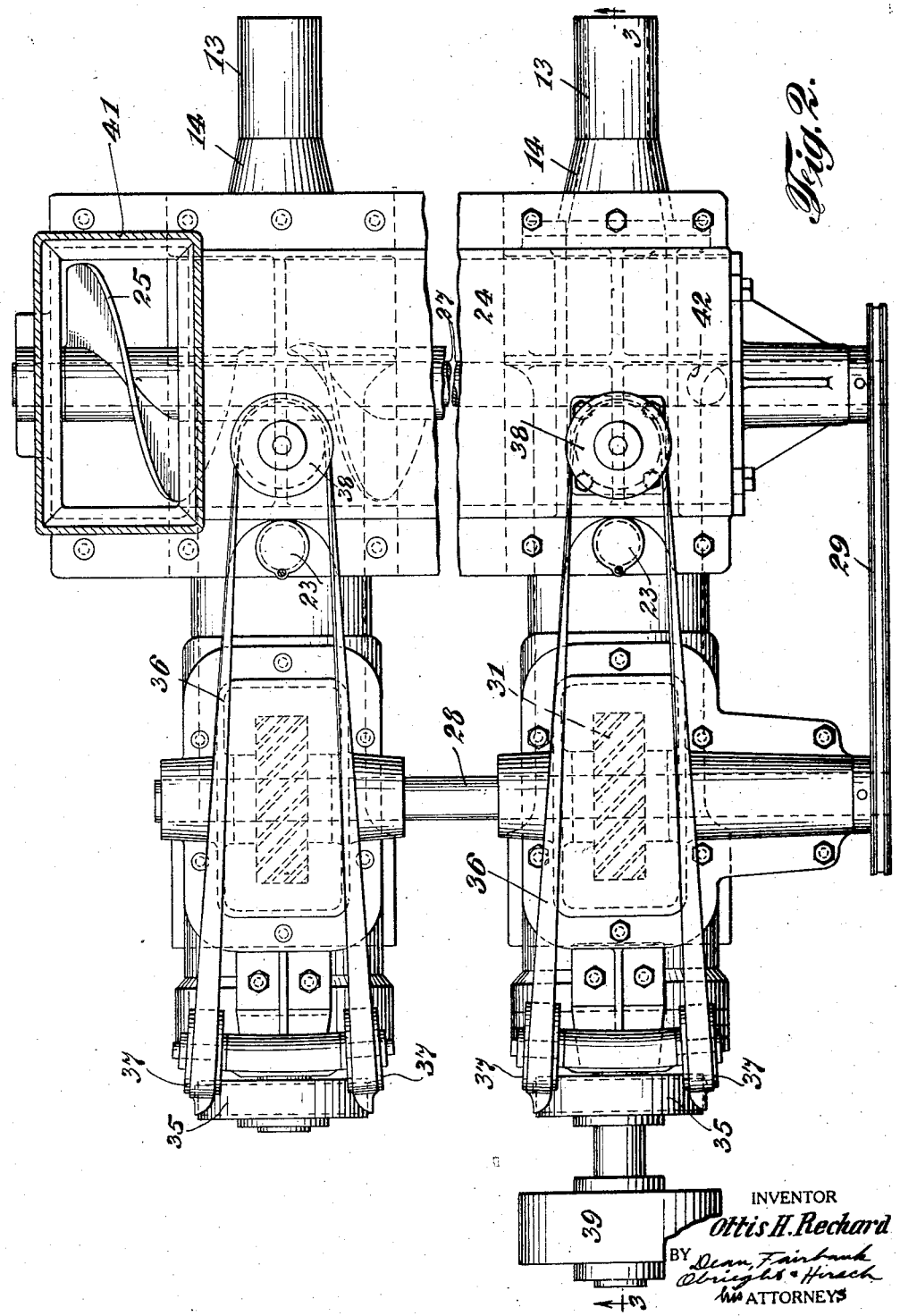

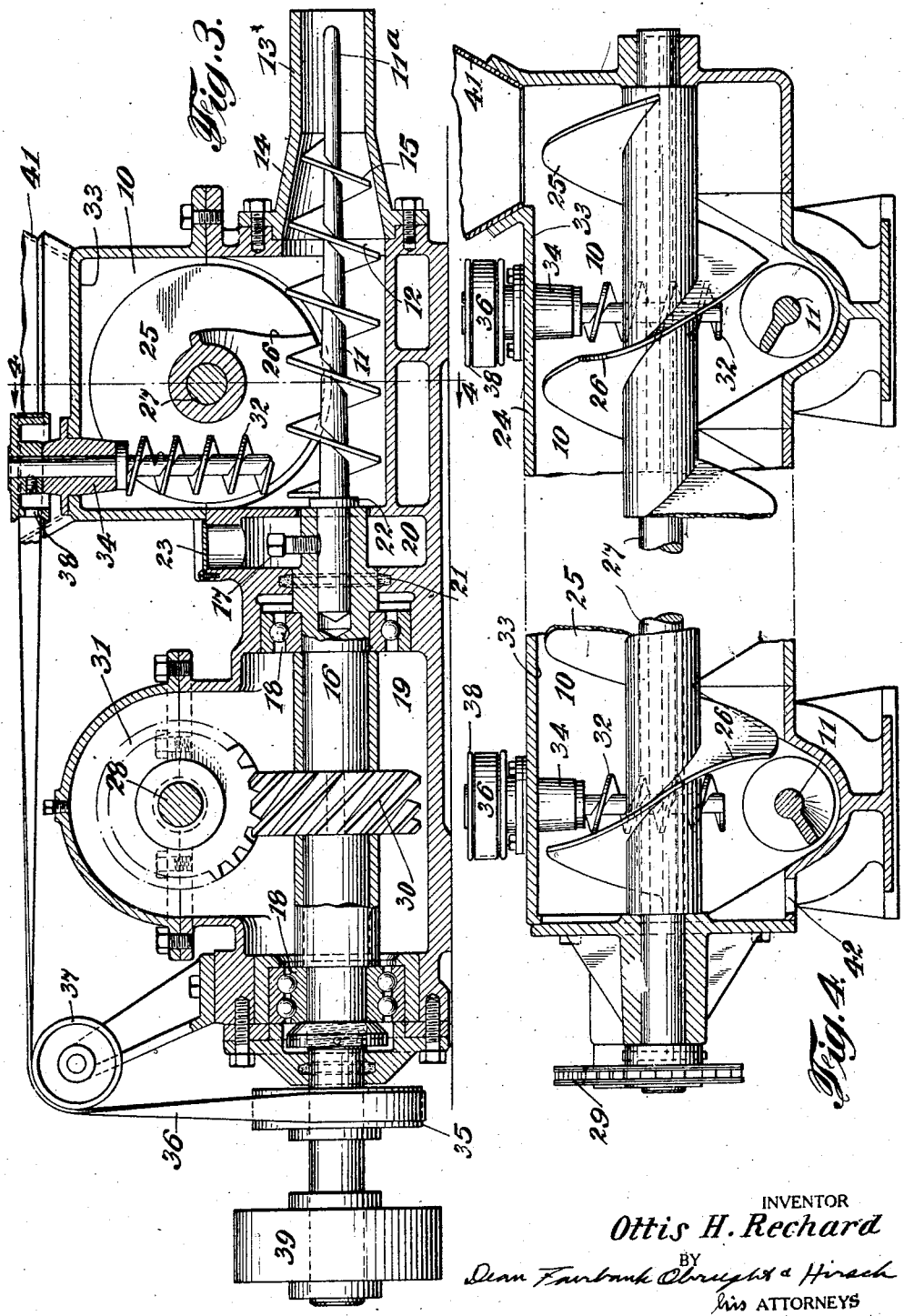

Patented Jan. 11, 1927.

1,614,256

UNITED STATES PATENT OFFICE.

OTTIS H. RECHARD, OF YORK, PENNSYLVANIA.

EXTRUSION MACHINE.

Application filed January 7, 1925. Serial No. 977.

This invention is an improvement in machines for extruding plastic material to press and give definite form thereto, for instance in the manufacture of fuel or other briquets. It relates to that type of machine in which an auger or screw conveyor serves to force the material through one or more outlets, whereby the stream of emerging material is of a cross-sectional form determined by the size of the outlet, and of a stiffness or hardness determined by the character of the material and the length of the tubular outlet passage.

In machines of this character there is commonly employed a hopper or container from the lower portion of which the material is withdrawn by the auger. The side walls usually converge at the lower end to approximately the diameter of the auger, in order that all of the material may be delivered to the auger, but this necessitates the making of the hopper of comparatively small capacity, requiring frequent refilling.

Many materials are sufficiently stiff or coarse so that as the auger removes material from the bottom of the hopper, the material above the auger forms an arch from one side wall to the other, and sufficiently strong or stiff to support the material at the top. Thus as no more material can reach the auger, the apparatus ceases to function.

To overcome this difficulty, various forms of agitators or feeders have been proposed to break up the arching effect, or to force the material into the bite of the auger. Such devices operate satisfactorily with some materials, but do not overcome the necessity for frequent replenishing of the hopper or frequent attention on the part of the operative. For economical large scale operations, as for instance in making fuel briquets, it is important to keep the labor cost as low as posssible.

One object of my invention is to provide an improved means for continuously delivering the material to the auger from a hopper or container of such form and size that the material cannot readily arch over the feeding means, and of such size that it does not require frequent attention and replenishing.

A further object is to provide a feeding means which will deliver the material directly into the bite of the extruding auger, whereby the auger is positively fed.

A further object is to secure a positive delivery of material from the feeding means to the extruding auger, and to this end I provide an auxiliary feeding mechanism operating directly in the path of the main feeding means to remove material therefrom and force it into the auger.

A further object is to secure greater uniformity of product and the employment of less labor in tending the machine, and to this end I provide a feed means of such a type and so constructed that it may operate to deliver the material to a series of extruding augers whereby all of the augers may draw from a separate large size container.

A further object is to provide an improved form of extruding auger and casing, whereby the material is more effectively compressed in solid bar or tubular form.

In the accompanying drawings I have illustrated merely one embodiment of my improved machine, and which I desire to be considered in an illustrative rather than a limiting sense.

In these drawings:

Fig. 2 is a top plan view.

Fig. 3 is a section on the line 3—3 of Fig. 2, and

Fig. 4 is a section on the line 4—4 of Fig. 3.

Figure 1:
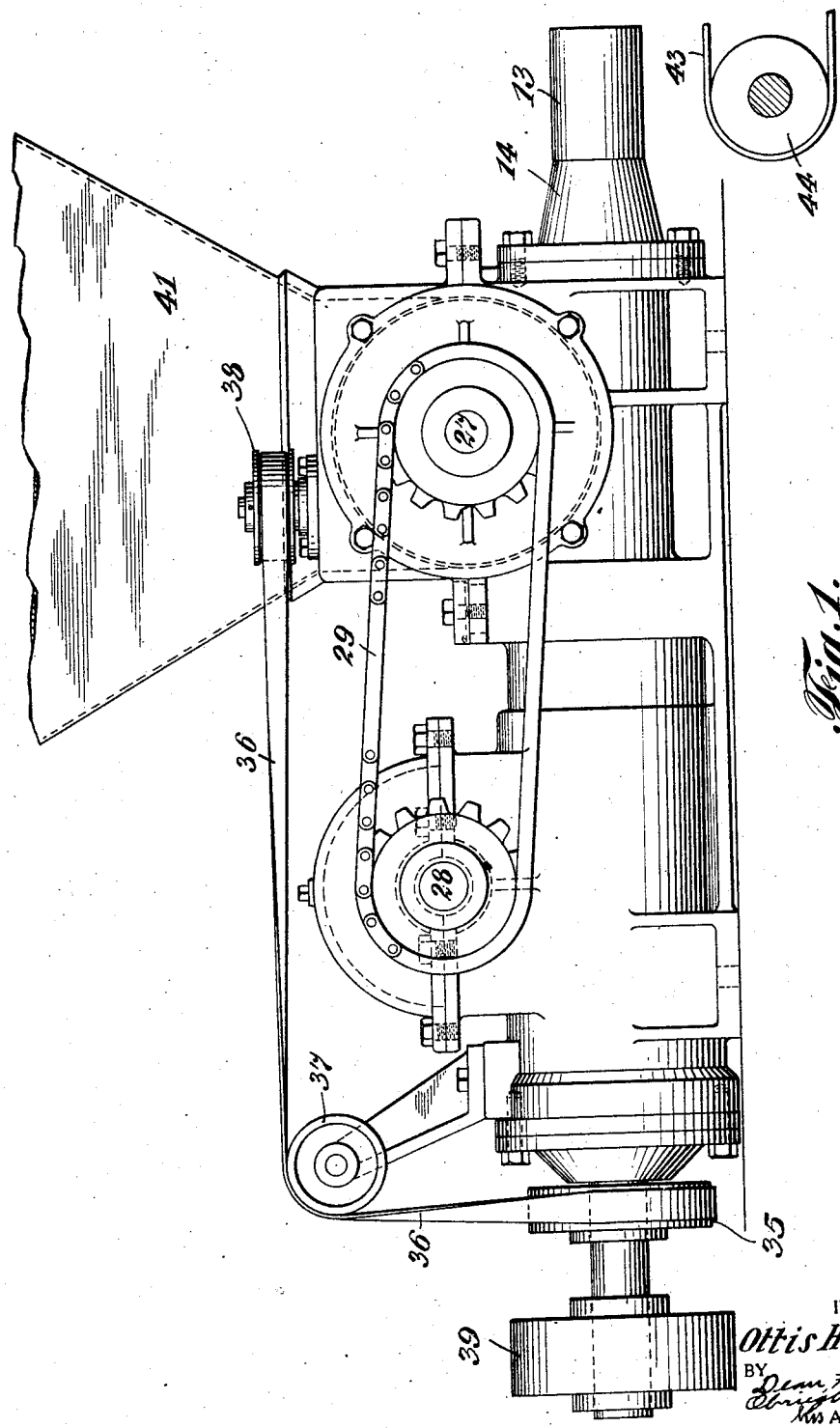
Fig. 1 is a side elevation of a machine embodying my invention.

The particular machine illustrated is designed primarily for large scale operations in the manufacture of briquets, as for instance from coal dust and a binder.

In the machine illustrated there is provided a small hopper or chamber 10 in the lower portion of which is mounted the extruding auger 11. The portion of the auger within the hopper is preferably substantially uniform and substantially equal to the diameter of an aperture 12 in the wall of the hopper and through which the auger extends. This outlet opening 12 delivers to a tube 13 of a smaller diameter than the opening, and between the two is a conical connecting portion 14. The auger also has a conical portion 15 disposed within this conical section 14 so that the material as it is delivered from the hopper by the auger is compressed radially at the same time it is forced axially, and thus it is placed under the desired high pressure in the tube 13. The tube offers a resistance to the passage of the material therethrough, and this makes a back pressure on the material whereby the material is compacted or compressed to the desired degree. By varying the length of the tube 13 the pressure exerted on the material delivered to the tube may be varied at will. If it is desired that the extruded material be of tubular form rather than a solid rod, the shaft or spindle of the auger may have an extension 11ª extending into and coaxial with the tube 13, so that there is a continuous central passage in the extruded material.

Outside of the chamber of hopper 10 there is provided a main drive shaft 16 for the auger. This is preferably in alignment with the auger and is connected thereto in any suitable manner, as for instance by projecting the spindle of the auger into a socket in the end of the drive shaft, and retaining it therein by a set screw 17. The shaft 16 is supported in any suitable manner, as for instance by ball bearings 18, and serves as the sole support for the auger. The ball bearings may be at opposite ends of a gear chamber 19 which may be filled with lubricant, and the passage of the lubricant to the hopper or chamber 10 may be prevented by an intermediate chamber 20 in which is mounted the connecting means between the shaft and the auger. An oil packing 21 is disposed at one side of this chamber 20, while the auger has a collar 22 engaging with the wall of the hopper at the other side of the chamber 20. The chamber 20 may have a closure 23 which may be removed to permit operation of the set screw 17 when it is desired to axially adjust the auger or to remove the same. It will be noted that the conical portion 14 of the delivery tube is detachably secured to the wall of the hopper, whereby its removal permits the endwise removal of the auger.

The chamber 10 in the lower portion of which the auger operates, is made comparatively small, and in fact may form merely one section of a transversely extending conduit 24 in which there is mounted a screw conveyor 25. This conveyor has a helical blade and is preferably made very much larger in diameter than the auger 11, and has its blade of such pitch in respect to the relative rates of rotation of the auger and conveyor that it supplies material at an adequate rate for the auger. Preferably the conveyor rotates at a very much slower rate than does the auger, and this is of course possible because of the very much larger size of the conveyor. In order that the material may be positively fed to the auger, the auger and conveyor are mounted at distances apart materially less than the sum of the radii of the blades of the auger and conveyor. In order to permit this juxtapositioning of the two parts the blade of the conveyor is interrupted or provided with a gap or recess 26 for such a distance along the length thereof as will permit of the free rotation of the feeding conveyor and the auger without either engaging with the other. Preferably the size of the gap or interruption in the blade of the conveyor 25 is no greater than is necessary to permit the free operation of both rotary members. It will be noted that the conveyor thus feeds directly into the bite of the auger, so that the material is positively fed into the space between successive turns of the auger blade, and that the auger blade positively removes material laterally from the screw conveyor. This juxtapositioning of the parts with the relative low speed of the conveyor and the relatively high speed of the auger, insures the proper and uniform pressure feeding of the auger and the desired uniformity of compression on the emerging or extruded material.

The driving mechanism for the feeding conveyor and the auger are so connected as to maintain the desired speed ratios. As shown, the shaft 27 of the conveyor is driven from an auxiliary shaft 28 by a chain 29 and a pair of sprockets, and the auxiliary shaft 28 is driven by a spiral gearing from the main shaft 16. As illustrated this gearing includes a spiral gear 30 on the shaft 16 and a spiral gear 31 on the shaft 28, and within the gear casing 19. The gearing may serve for speed reduction, and the ratio as well as the relative proportioning of the sprocket wheels of the chain 29 may be varied, so that the feeding conveyor 25 may be operated at the desired speed in accordance with the number and character of the augers. Preferably the pitch of the gear 30 is opposite to that of the auger 11, so that the end thrust on each tends to neutralize that on the other.

If the material be particularly sticky, or adheres to the conveyor so as to rotate with the latter rather than be merely advanced axially of the conveyor, an auxiliary feeding mechanism may be employed. As shown such auxiliary feeding mechanism includes a screw conveyor 32 projecting downwardly from the cover or top wall 33 of the chamber 10 and transversely of the conveyor at the side thereof corresponding to the inlet or receiving end of the auger 11. This auxiliary feeding screw conveyor 32 is carried by a journal 34 and may be driven in any suitable manner. As illustrated, the main drive shaft 16 has a pulley 35 from which a drive belt 36 may pass over a pair of idlers 37 to a pulley 38 on the upper end of the shaft of the feed screw 32.

It will be noted that the auxiliary feeding mechanism 32 operates directly in the path of the screw conveyor 25 and this is possible by reason of the gap or interruption 26 in the blade of the conveyor. The auxiliary feed operates vertically to positively deliver material from the screw conveyor directly into the receiving end of the auger, and operates within the same gap or interruption of the blade as that in which the auger operates. Obviously with many materials the auxiliary feed is not necessary and may be entirely omitted.

As previously indicated, one important feature of my improved machine is the arrangement whereby a single screw conveyor feeds a plurality of the extruding augers. The conveyor 25 may be of any suitable length and mounted in a tubular casing 24, sections of which form the chambers 10, and other sections of which form the connecting means between adjacent chambers. The augers may in effect be merely mounted in parallel transverse grooves in the lower side of this tubular casing 24, as indicated in Fig. 4. There may be as many of the augers as desired along the length of the casing, and for each auger there is a corresponding gap or interruption in the blade of the screw conveyor. Only one of the auger shafts 16 need have a drive pulley 39 for the connection to the source of power. The shafts of all of the augers may be connected together for simultaneous rotation from a single source of power in any suitable manner, as for instance by the shaft 28 and gearing 30, 31, to each shaft 16. The drive pulley 39 may be on this shaft 28.

When a plurality of the augers are fed from a single screw auger conveyor, it is obvious that the pitch of the screw of the latter and the speed of rotation should be such as will adequately supply material to all of the augers. The conveyor itself may receive material from any suitable source, such for instance as a hopper 41, and as the conveyor 25 is very much larger in diameter than the auger, it is evident that the hopper 41 may be of such a width that there is no danger of the material arching over in the hopper to interfere with the delivery of material to the feeding conveyor. The hopper or container 41 may be made of adequate size to supply a large number of augers for a considerable length of time, and as all of them draw from this same source there will be greater uniformity of product than is possible if each draws from a separate hopper. The end of the tubular casing 24 beyond the last auger may have an outlet 42 for excess, and suitable means may be employed for catching this material and returning it to the hopper 41.

There is preferably provided a conveyor in connection with each delivery tube 13 for carrying away the extruded material. As shown in Fig. 1, this includes a belt 43 running over a pulley 44, and having its upper run below and parallel to the axis of the delivery tube. The extruded material may be carried off on the belt as a continuous rod, to a cut-off mechanism, or may break into sections by its own weight and fall on to the belt. Cut-off mechanism may be directly at the end of the delivery tube.

It will of course be understood that the machine is not in any way limited in its use for the making of fuel briquets, but may be employed for mixing, compressing and extruding any sort of plastic or semi-plastic material. The extruded material may be merely dried, or may be heated or baked to additionally harden the same and render it better adapted for shipment, storage, and use.

Having thus described my invention, what I claim as new and desire to secure by Letters Patent is:—

1. An extrusion machine including an extruding auger and a screw conveyor operating transversely thereof and delivering thereto, the blade of the conveyor having a gap or interruption therein and receiving said auger.

2. An extrusion machine including a screw conveyor, an extruding auger operating transversely thereof, the distance between the axes of said conveyor and auger being less than the sum of the radii of the conveyor and auger, and the blade of the conveyor having a gap within which the auger operates.

3. An extrusion machine having an extruding auger and a feed screw of larger diameter and operating transversely thereof, the auger being disposed intermediate of the ends of the conveyor.

4. An extrusion machine including a screw conveyor having an aperture in the periphery of the blade thereof, an auxiliary feeding mechanism disposed adjacent to said conveyor and operating within said recess, and an extruding auger receiving the material from said auxiliary feeding means.

5. An extrusion machine including a screw conveyor having a helical blade provided with a gap in the peripheral edge thereof, an auxiliary feeding mechanism operating transversely of the conveyor and within said gap, and an extruding auger also operating transversely of said conveyor and within said gap, said auxiliary feeding mechanism and said auger being disposed at right angles to each other.

6. An extrusion machine including a screw conveyor and a plurality of extruding augers arranged along the length thereof and each receiving material therefrom.

7. An extrusion machine including a plurality of extruding augers and a feeding mechanism disposed transversely thereof and operating to deliver material to each of said augers.

8. An extrusion machine including a plurality of extruding augers and a feeding mechanism disposed transversely thereof and operating to deliver material into the bit of each of said augers.

9. An extrusion machine including a tubular casing, a screw conveyor disposed therein, and a plurality of extruding augers disposed transversely of said casing and projecting into the latter.

10. An extrusion machine including a plurality of extruding augers arranged side by side, a separate casing for each auger, a casing formed of sections and connecting said first mentioned casings together in series, and a screw conveyor disposed in said last mentioned casing.

11. An extrusion machine including a tubular casing, a screw conveyor disposed therein and having chambers along the length thereof, and a plurality of extruding augers arranged side by side, one operating in each of said chambers.

12. An extrusion machine including a tubular casing, a screw conveyor disposed therein and having chambers along the length thereof, and a plurality of extruding augers, each operating in a separate one of said chambers, and projecting into the path of the material advanced by said conveyor.

13. An extrusion machine including a tubular casing having chambers arranged along the length thereof, a conveyor within said casing and having interruptions in the blade thereof at each of said chambers, and transversely disposed extruding augers within said chambers and disposed opposite to the corresponding interruptions in said conveyor.

14. An extrusion machine including a plurality of parallel extruding augers arranged side by side each having a feed chamber, a casing connecting said chambers together in series, a second and larger feed chamber, and a screw conveyor for delivering material from said last mentioned feed chamber through said casing to each of said first mentioned feed chambers.

15. An extrusion machine including a drive shaft, an extruding auger having a helical blade, a feeding mechanism for delivering material to said auger, and a driving means for said feeding mechanism and including a worm wheel on said drive shaft and of opposite pitch to that of the auger, whereby end thrust on one counteracts end thrust on the other.

Signed at York, in the county of York and State of Penna., this 27th day of December A. D. 1924.

OTTIS H. RECHARD.